No. 843,556. PATENTED FEB. 5, 1907.
G. BODEN.
AUTOMATIC SPRINKLER CLOSER.
APPLICATION FILED JUNE 1, 1904.
2 SHEETS—SHEET 1.
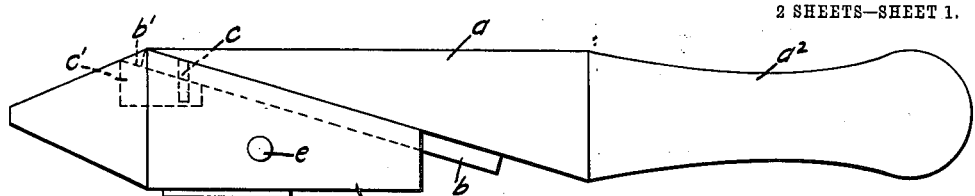
FIG. 1.
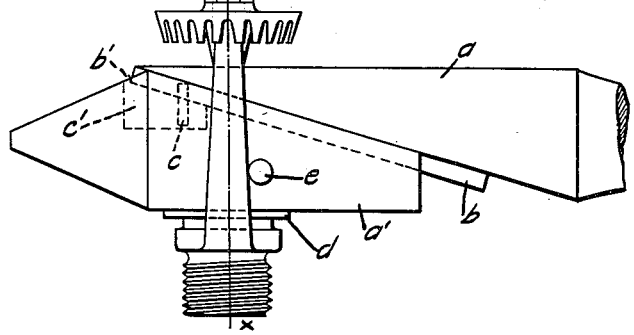 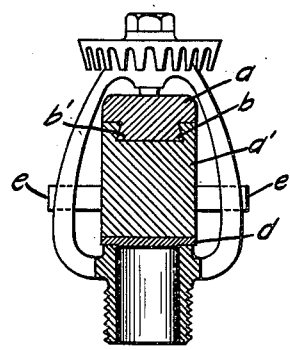
FIG. 2. FIG. 3.
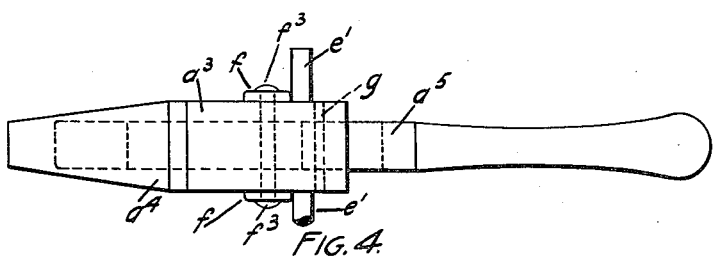
FIG. 4.
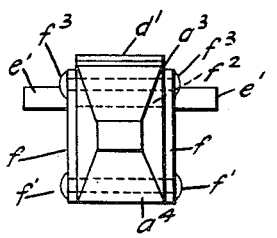 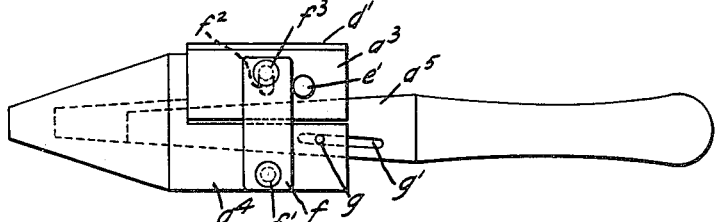
FIG. 6. FIG. 5.
WITNESSES,
James H. Thurston
Catherine G. Bradley.
INVENTOR,
George Boden
By Wilmarth H. Thurston
ATTY.

No. 843,556. PATENTED FEB. 5, 1907.
G. BODEN.
AUTOMATIC SPRINKLER CLOSER.
APPLICATION FILED JUNE 1, 1904.
2 SHEETS—SHEET 2.
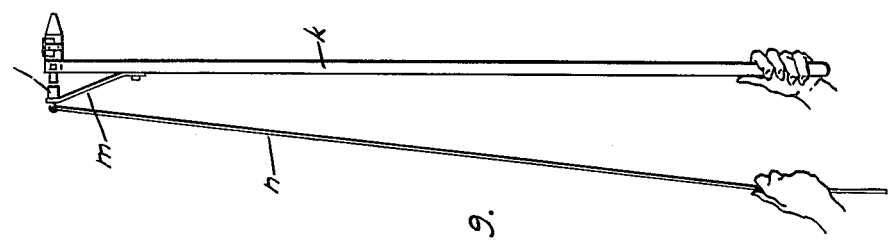
FIG. 9.
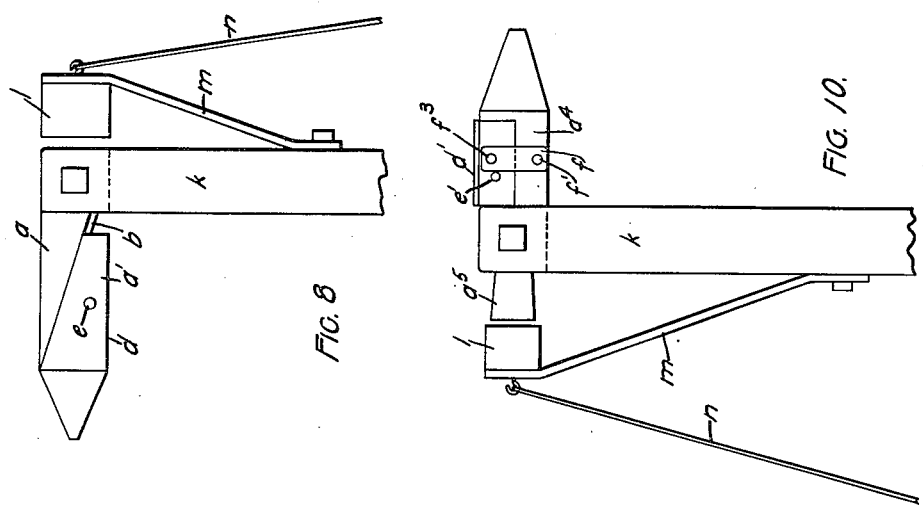
FIG. 8. FIG. 10.
FIG. 7.
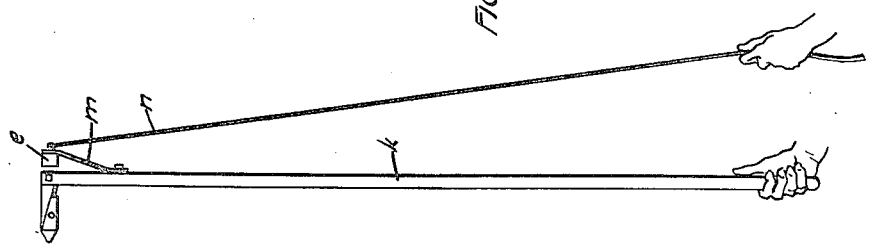
WITNESSES, INVENTOR,
James H. Thurston George Boden
Catherine G. Bradley By Wilmarth H. Thurston
ATT'Y.

UNITED STATES PATENT OFFICE.

GEORGE BODEN, OF WATERTOWN, CONNECTICUT, ASSIGNOR OF ONE-HALF TO JULIUS H. BRONSON, OF WATERBURY, CONNECTICUT.

AUTOMATIC SPRINKLER-CLOSER.

No. 843,556.      Specification of Letters Patent.      Patented Feb. 5, 1907.

Application filed June 1, 1904. Serial No. 210,639.

*To all whom it may concern:*

Be it known that I, GEORGE BODEN, of Watertown, in the county of Litchfield and State of Connecticut, have invented certain new and useful Improvements in Automatic Sprinkler-Closers; and I do hereby declare the following specification, taken in connection with the accompanying drawings, forming a part of the same, to be a full, clear, and exact description thereof.

The object of the present invention is to provide means for temporarily closing an automatic sprinkler after it has operated and extinguished the fire in order to prevent the damage that might result from the continued and unnecessary flow of the water from such sprinkler.

The invention consists in the means hereinafter described and claimed for accomplishing that object.

Referring to the drawings, Figure 1 is a side view of the sprinkler-closer. Fig. 2 is a corresponding view showing the device in place in a sprinkler and closing the outlet thereof. Fig. 3 is a section on the line $x\ x$, Fig. 2. Fig. 4 is a plan view, Fig. 5 a side view, and Fig. 6 an end view, of a modified construction. Figs. 7, 8, 9, and 10 are views showing means for locating and operating the device.

In the form shown in Figs. 1 to 3 the sprinkler-closer, which may be of wood or other suitable material, comprises two wedge-shaped members $a\ a'$, arranged to slide one with relation to the other.

The member $a$ is shown as provided with a handle $a^2$ and with a dovetail projection $b$, constructed to slide in a correspondingly-shaped groove $b'$, formed in the member $a'$. A pin $c$, projecting from the under side of the member $a$ and arranged to enter a groove $c'$, formed in the member $a'$, serves to limit the relative movement of the two members. A piece of leather $d$ is preferably secured to the face of the member $a$ to constitute a valve. The member $a'$ is preferably provided with two oppositely-projecting pins $e\ e$ to serve as stops to properly locate the device in the sprinkler and also to prevent the further movement of the member $a'$ when once located.

The mode of using this device is as follows:

The device with the parts in the position shown in Fig. 1 is inserted within the frame of the sprinkler until the pins $e\ e$ bring up against said frame, which will locate the valve $d$ in line with the outlet of the sprinkler. By striking the end of the handle $a^2$ with a hammer or other suitable implement the member $a$ will be driven along the member $a'$, which will be held against movement by the engagement of the pins $e\ e$ with the frame of the sprinkler, and by reason of the opposing wedge-shaped faces of the members $a\ a'$ the valve $d$ will be forced to its seat against the outlet of the sprinkler and so as to effectually close the same.

In the construction shown in Figs. 4 to 6 the two members $a^3\ a^4$ instead of being provided with wedged-shaped contacting faces and constructed to have a longitudinal movement with relation to each other are constructed to have a third member $a^5$ inserted between them, said third member being wedge-shaped and adapted to force the two members $a^3\ a^4$ apart. Each of the members $a^3\ a^4$ is provided with a groove, preferably rectangular in cross-section, and with the bottom of the groove inclined, and the third member $a^5$ is constructed to enter said grooves, the opposite faces of said member $a^5$ being inclined or wedge-shaped to coöperate with the inclined bottoms of said grooves, as shown. Side pieces or guides $f\ f$ are secured to the member $a^4$ by a pin or pivot $f'$, and a second pin $f^3$ extends through a transverse slot $f^2$, formed in the member $a^3$, and is secured in the ends of the guides $f\ f$. A transverse pin $g$, extending through the member $a^4$ and through a slot $g'$ in the third member $a^5$, serves to limit the relative movement of said members or to prevent the member $a^5$ from falling out of place. Pins $e'\ e'$ project from the member $a^3$ on opposite sides thereof, which serve to locate the device in the sprinkler and also to hold the members $a^3\ a^4$ from moving with the third member $a^5$ when the latter is driven between them. Preferably one of the members, as $a^3$, is faced with a piece of leather $d'$ to serve as a valve.

The device is used in the same way as that shown in Fig. 1—that is, is inserted within the frame of the sprinkler until the pins $e'\ e'$ bring up against said frame—and then by striking the end of the member $a^5$ with a hammer or other suitable implement said member $a^5$ is driven between the members $a^3$ $a^4$, so as to force said members apart and force the valve $d'$ against its seat to close the outlet of the sprinkler.

For the purpose of conveniently locating the closing device in place in an open sprinkler from the floor the device may be provided with a staff or handle $k$, as shown in Figs. 7 to 10. In Figs. 7 and 8 the staff is shown in connection with the form of device shown in Figs. 1 to 3. In this case the handle $a^2$ is omitted and the staff $k$ is secured to the member $a$, preferably at right angles thereto. It is preferred to provide the device with a hammer or striker secured thereto and which will thus be always at hand when wanted. The hammer or striker $l$ consists of a block of metal or other suitable material secured to the free end of a flat spring $m$ of suitable shape, the opposite end of said spring being secured to the staff $k$. A cord $n$ is attached to the hammer $l$ or the spring $m$.

When the closing device has been inserted in place in the sprinkler, the valve $d$ may be forced to its seat by pulling upon the cord $n$ and releasing the same, which will serve to cause the hammer or striker $l$ under the action of the spring $m$ to strike a blow upon the end of the staff or the member $a$ and so as to impart the necessary movement thereto relative to the member $a'$. The operation of pulling and releasing the cord may be repeated as often as may be found necessary to securely force the valve of the closing device to its seat.

In Figs. 9 and 10 the staff is shown in connection with the form of device shown in Figs. 4 to 6. In this case the staff $k$ is secured to the member $a^4$ and the hammer or striker $l$ is arranged to strike the end of the wedge-shaped member $a^5$. The operation of the hammer by pulling and releasing the cord $n$ is the same as before.

If desired, the piece of leather to serve as a valve may be omitted and one of the members of the device made to serve as the valve; but it is preferred to employ the piece of leather or other suitable material to insure a tighter closing of the sprinkler.

As shown in the drawings, the staff $k$ is rigidly secured to the sprinkler-closing device, the staff being rabbeted at its upper end with one member of the closing device fitted in said rabbet.

Any suitable means of securing the staff to the sprinkler-closer may be employed and, if desired, the staff may be detachably secured thereto.

What I claim as my invention, and desire to secure by Letters Patent, is—

1. The combination of a sprinkler-closer, a staff for inserting said closer in place in a sprinkler, and a hammer or striker for operating said closer to close the outlet of the sprinkler, substantially as described.

2. The combination of a sprinkler-closer comprising a member adapted to act as a valve, and a wedge-shaped member for forcing said valve to its seat, a staff for inserting said closer in place in a sprinkler, and a hammer or striker for actuating said wedge-shaped member, substantially as described.

3. The combination of a sprinkler-closer comprising a member adapted to act as a valve, and a wedge-shaped member for forcing said valve to its seat, a staff for inserting said closer in place in a sprinkler, a hammer or striker for actuating said wedge-shaped member, and a cord for operating said hammer, substantially as described.

4. An automatic sprinkler-closer comprising a member adapted to act as a valve to close the outlet of a sprinkler, said member being provided with means to locate the same with relation to said outlet, and a wedge-shaped member for forcing said valve to its seat, substantially as described.

5. An automatic sprinkler-closer comprising a member provided with a valve to close the outlet of a sprinkler, said member being provided with means to locate said valve with relation to said outlet, and a wedge-shaped member for forcing said valve to its seat, substantially as described.

6. An automatic sprinkler-closer comprising a member adapted to act as a valve to close the outlet of a sprinkler, and a wedge-shaped member for forcing said valve to its seat, said valve member being provided with means to engage the frame of the sprinkler to prevent the movement of said valve member under the action of said wedge-shaped member, substantially as described.

7. An automatic sprinkler-closer comprising a member adapted to act as a valve to close the outlet of a sprinkler, and a wedge-shaped member for forcing said valve to its seat, said valve member being provided with means to engage the frame of the sprinkler to locate the same with relation to said outlet and to prevent the movement of said valve member under the action of said wedge-shaped member, substantially as described.

GEORGE BODEN.

Witnesses:
C. E. DAVIS,
C. B. BUCKINGHAM